8228X
J. Eastman,
Horse Power.
Patented May 31, 1834.
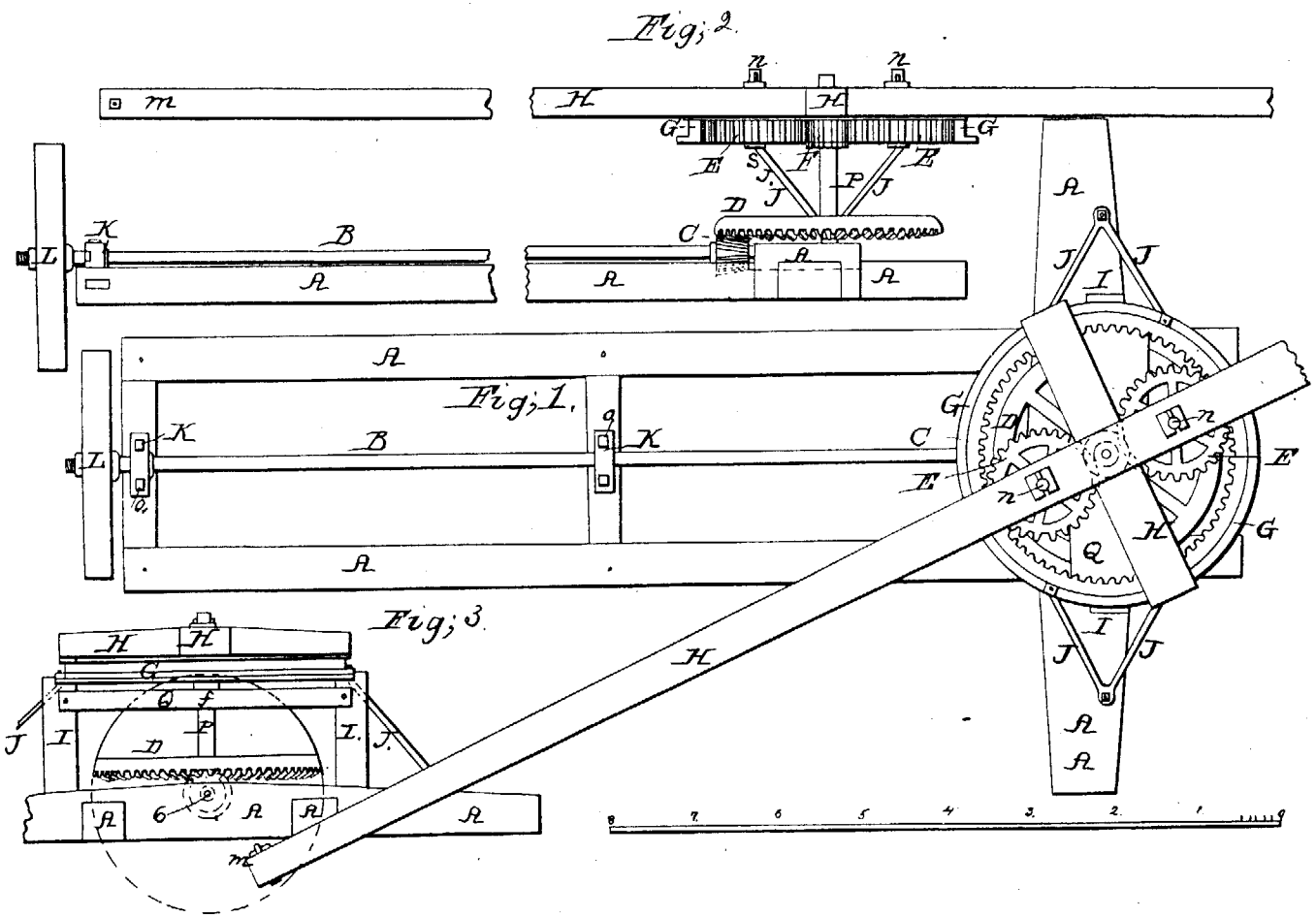
AM. PHOTO-LITHO. CO. N.Y. (OSBORNE'S PROCESS)

596 8228 X                                                    Drawing 2d
John Martineau Adm of                          May 31. 1834          403.

Joel Eastman. New Hampshire

Letters Patent

The Schedule referred to in these Letters Patent and making part
of the same containing a description in the words of the said John
Martineau Administrator of the late Joel Eastman of the said East-
man's improvement in the arrangement and combination of wheels
and other parts of a Machine for the application of the power of
Horses and other Animals To whomsoever these presents shall come
Be it known that I John Martineau. of the Town of Elbridge
County of Onandoga and State of New York Administrator of the
of New Hampshire & acting in trust for his heirs & legal Representatives in all
late Joel Eastman ^ matters relating to the inventions and improve-
Know ye the fact that the late Joel Eastman of New Hampshire
ments of the said Joel Eastman do hereby declare and make ^ did
shortly before his decease invent an improvement in the arrange-
ment and combination of wheels and other parts of a machine for
the application of the power of Horses or other animals for the
accomplishment of any objects for which such power is conveni-
ently applicable. commonly called a Horse power a model of which
made by his (Joel Eastman's) own hands is herewith presented
showing in connection with accompanying drawings description
and references wherein his improvement consists. Some of
the objects or purposes to which this improved Horse Power is
applicable are to drive threshing Machines. Cotton gins and
Horse mills. It may be applied to many other purposes.
The following is a full description of the arrangement and com-
bination of wheels, and other parts embraced in the construction
of the aforesaid Horse Power Machine which I will describe
availing myself by reference to the accompanying drawings of ad-
vantages as well as may be to make myself understood.
Fig 1 is a ground or horizontal view of the machine. Fig 2. is Drawing

8228X a side view elevation and Fig 3. an end view elevation. It may
[illegible] be remarked, that in all the figures the same letters apply to correspond
ing parts of the Machine. AAAA Fig 1. shows the foundation timbers lon
gitudinally and the cross piece under the wheels. The longitudinal pieces
are connected in the centre and at the other end by cross pieces T.T.–B.
represents a horizontal shaft with a bevel pinion on one end C. and
on the other end is the drum or pulley I to receive the band that is
to communicate motion to the threshing machine Cotton Gin or
other apparatus K.K. are Boxes in which the shaft runs and
by which it is kept in its proper place – these Boxes are secured
by screw bolts. O, O – D represents the bevil wheel geared into
pinion C the bevil wheel is hung on upright shaft or Journal
P which also receives pinion F shown in elevation fig 2. which
gears into two spur wheels E.E. which last gear into a stationa
ry wheel g.g. which is supported by two upright timbers I I. and
iron braces J.J.J.J. The spur wheels E.E. are supported by
journals n.n. which are provided with a projecting flange
or collar on the lower end to keep the wheels from dropping
off. The journals pass up through the lever H crossed by a
steadying piece H. they are provided with a shoulder that comes in
contact with the lower side of the lever E and are firmly secured
in their places by keys driven thro' their upper ends counteracted
by a metallic plate let into the wooden lever or drawing bar
which also is provided with a ring bolt and clevis to attach
the Horse to O, O is a horizontal piece of timber connected with I I
and provided with a hole in the centre through which the upright
shaft or Journal P passes and by which it is steadied and suppor
ted in its position partially, being assisted in no small degree by
the wheels E.E. pinion F. and the whole of them being within the sta
tionary wheel G.G. are kept in their relative positions. S.S. shew the
collars or flanges on the journals N.N. that keep the wheels E.
E from dropping off — It is not deemed necessary to give
in writing the dimensions of the several parts above described as a scale

8228X is appended to the drawing which will readily explain. nor is it
proper to limit the several parts to the dimensions here laid down
they may be varied and should be adapted to the amount of power
in any particular case intended to be applied
The plan of the wood work may be varied perhaps with advantage
by substituting for the longitudinal pieces AA and cross pieces T T
a single piece forming with large cross piece A.A a simple cross.
The wheels E E may also be supported in their proper place by a
cast iron bar. with pins or Journals cast on solid or with a hole
and the journals made of wrought iron or Steel and inserted and prop
erly secured in their places by keys or screws and nuts. nor is it
necessary to limit the spur wheels E E to two. any additional
one may be added perhaps with advantage. making three spur
wheels geared into the pinion F and stationary wheel G G. These
three spur wheels may be hung on three arms connected at the cen
tre and by a circular rim corresponding with the solid part of
the stationary wheel G G. To each of the arms a journal may
be cast on solid, or be provided with a hole and have a
wrought Iron or steel journal inserted and secured as before
observed or the whole may be made of wrought iron. Other
details may also be varied to suit the taste of different persons.
If the iron rim as last described be used it may be provided
with cheeks or brackets projecting upwards forming a birth
for the reception of the drawing lever which would thus have
room to spring across the whole diameter of the stationary wheel.
constituting it a spring lever When instead of an entire wooden
drawing lever, with a cross steadying piece supplied with iron
journals as before described. a cast iron bar is used with solid
journals cast on. or wrought or steel journals inserted.
The drawing lever may be attached thereto by screw bolts and when
three spur wheels are geared into the stationary wheel and pin
ion supported by a tripple arm connected with the centre and
periphery. a hole may be formed in the centre for the reception 406 8228 X the journal of the upright shaft P. the journals of all the wheels
pinion in that case being relatively pressed. they cannot easily
— In regard to the dimensions of the wheels and the mo
tion of the drum or pulley it may be observed that a very suit
able size for the Stationary Wheel G G. for all ordinary purpo
ses is from 34 to 40 inches diameter of pitch circle and the
pinions from one sixth to one eighth of the same. The bevil wheel should
be a little smaller say about six inches and its pinion bearing about the same
proportion to it, that pinion E bears to stationary wheel G G. The drum
or pulley L may be about 3 feet in diameter and revolve from fifty to six
ty times for one revolution of the lever. There is a trifling variation in the draw
ing of the frame work from the model. in the latter the pulley or drum is
placed within the frame and the pieces represented by I I in the model
are solid. being joined solid with the longitudinal pieces A A. These
differences are merely noticed but are not deemed of any special importance
What I claim as the invention of Joel Eastman, in trust
for his Heirs and legal representatives is the combination of wheels consist
ing of Stationary Wheel G G and the wheels E E including a third
wheel if necessary, and pinion E all geared together. The improve
ment effected by which arrangement is the advantage of bringing cogs
into gear and action on opposite sides of the journal of the pinions
by means of which the stress is taken off the journal. and two or more
cogs being brought into action at the same instant the stress is divided
and distributed thereby diminishing the liability of breaking the cogs
in fact the strength by this arrangement when the cogs are of the same
size is doubled or trebled if three wheels be used another advantage resulting
from this arrangement is compactness and portability
These and all other advantages that are derived from this application of
the foregoing described combination however the same varied or modified in
[illegible] I claim as administrator in trust for the Heirs and legal
representatives of the aforesaid lately deceased Joel Eastman Witnesses { James Holly
{ B. [illegible]

John [illegible]
Administrator

6P1196.

[1664 ...]